US012645806B2

(12) United States Patent
Stremlau

(10) Patent No.: US 12,645,806 B2
(45) Date of Patent: Jun. 2, 2026

(54) VISUAL AND AUDIO OUTPUT AUTHENTICATION IN AVATAR SYSTEMS

(71) Applicant: NVIDIA CORPORATION, Santa Clara, CA (US)

(72) Inventor: Thorsten Peter Stremlau, Cary, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 110 days.

(21) Appl. No.: 18/444,428

(22) Filed: Feb. 16, 2024

(65) Prior Publication Data

US 2025/0265355 A1     Aug. 21, 2025

(51) Int. Cl.
| | |
|---|---|
| *G06F 21/60* | (2013.01) |
| *G06F 21/10* | (2013.01) |
| *G06F 21/16* | (2013.01) |
| *G06F 21/32* | (2013.01) |
| *G06F 21/50* | (2013.01) |
| *G06F 21/64* | (2013.01) |
| *G10L 15/08* | (2006.01) |

(52) U.S. Cl.
CPC ........ *G06F 21/602* (2013.01); *G06F 21/1063* (2023.08); *G06F 21/32* (2013.01); *G06F 21/50* (2013.01); *G06F 21/64* (2013.01); *G10L 15/08* (2013.01); *G06F 21/16* (2013.01); *G10L 2015/088* (2013.01)

(58) Field of Classification Search
CPC ..... G06F 21/32; G06F 21/16; H04N 21/8358; G06T 2201/0061
See application file for complete search history.

(56) References Cited

U.S. PATENT DOCUMENTS

| | | | | |
|---|---|---|---|---|
| 2006/0133647 | A1* | 6/2006 | Werner | H04N 19/467 |
| | | | | 375/E7.089 |
| 2014/0115659 | A1* | 4/2014 | Attfield | G06F 21/51 |
| | | | | 726/1 |
| 2014/0157349 | A1* | 6/2014 | Robinson | H04L 67/54 |
| | | | | 726/1 |
| 2016/0259941 | A1* | 9/2016 | Vasudevan | H04L 63/20 |
| 2016/0378964 | A1* | 12/2016 | Singh | A61B 5/7278 |
| | | | | 340/5.52 |
| 2017/0061562 | A1* | 3/2017 | Kim | G06T 1/005 |

(Continued)

*Primary Examiner* — William R Korzuch
*Assistant Examiner* — Aditya Sriram
(74) *Attorney, Agent, or Firm* — Squire Patton Boggs LLP; Sarah Mirza

(57) ABSTRACT

A method for countering digital impersonation and unauthorized digital or audio usage due to a rise of deep-fake technologies is described. The method employs biometric authentication to ensure user authenticity in real-time during avatar or voice recording. Unique watermarks are generated at predetermined intervals and embedded into audio and/or video outputs. Device integrity can be additionally verified through device attestation, verifying both hardware and firmware integrity of the visual and audio systems. The device attestation may generate a device authentication key which can be combined with a user authentication key based on the biometric authentication to generate a combined watermark. Accordingly, real-time verification tools allow for the authentication of the watermark, ensuring ongoing content authenticity.

17 Claims, 5 Drawing Sheets

(56)                    References Cited

U.S. PATENT DOCUMENTS

2018/0025462  A1*    1/2018  Li  ......................... G06T 1/0028
                                                                    382/100
2018/0121635  A1*    5/2018  Tormasov ............. H04L 9/3236
2018/0129796  A1*    5/2018  Oswal ..................... G06F 21/32
2019/0357049  A1*   11/2019  Tali ....................... H04W 12/64

* cited by examiner

VISUAL AND AUDIO OUTPUT AUTHENTICATION IN AVATAR SYSTEMS

TECHNICAL FIELD

Embodiments of the present disclosure relate generally to digital visual and audio output authentication and, more specifically, to techniques for generating cryptographic watermarks based on user biometric authentication for incorporation into video and/or audio content to address the rise of deepfakes.

BACKGROUND

Artificial intelligence and machine learning technologies have led to an increase in the misuse of digital visual and audio representations through deep-fake technologies ("deepfakes"). Deepfakes are synthetic media that have been digitally manipulated to convincingly alter or replace a person's likeness. Deepfakes leverage machine learning and artificial intelligence technologies to manipulate or generate visual and audio content, such as videos, images, or audio, that can more easily deceive viewers or listeners and, therefore, pose a serious threat to individual privacy, security in general, and are likely to result in an increase in misinformation, fraud, identity theft, and other forms of cyber malfeasance unless preventative techniques are implemented.

Conventional approaches for identifying or authenticating visual and audio content include digital watermarking. Digital watermarking is a technique commonly used to identify copyright ownership that embeds information into digital content. This embedded information has also been used to identify or authenticate the content in an attempt protect it from unauthorized modifications. However, the detection of unauthorized modifications relies on identifying whether the digital watermark has been either altered or removed and determined attackers may still find ways to preserve the digital watermark while making unauthorized modifications.

As the foregoing illustrates, what is needed in the art are more effective techniques for authenticating digital visual and/or audio representations to address the rise of deepfakes.

DETAILED DESCRIPTION

Deepfakes are synthetic media where the original media has been digitally manipulated using machine learning and artificial intelligence technologies to alter or replace a person's likeness, often very convincingly. The increasing misuse of deepfakes is a threat to individual privacy, organizational security, misinformation, fraud, identity theft, and/or other forms of cyber malfeasance. For example, leveraging machine learning and artificial intelligence technologies, an avatar of a likeness of public figure could be generated and recorded making statements that the public figure did not make or endorsing products the public figure did not endorse.

To combat misuse of deepfakes and ensure the authenticity of media origination, the disclosed techniques dynamically manage watermark embedding based on real-time biometric authentication. Users—or media originators—may be continuously authenticated during avatar or voice rendering using biometrics to ensure ongoing verification of user presence during the recording. Failure to authenticate may result in automatic removal, invalidation of the watermark, or otherwise cause the watermark to be omitted from a frame of content. Additionally, device attestation can be performed at the beginning of—or at intervals during—avatar or voice rendering to verify the integrity of the camera and audio systems to ensure that the recording was done on a device that is trustworthy.

More specifically, at instances during the recording of video or audio content, one or more biometric authentication operations are performed to authenticate the user. The instances at which the one or more operations are performed could be every frame, every n frames, every frame or n frames for which the user is speaking, or at each spoken word or trigger word—e.g., such as a predefined meaningful word that could potentially change the context or meaning of a statement spoken by the user, and so forth. In response to successful biometric authentication, a user authentication key is generated and a cryptographic watermark that represents continuous presence of the user during the recording for the instance is generated based on the user authentication key. Accordingly, the cryptographic watermark is embedded into a frame of the content for the instance.

Additionally, device attestation can be performed to verify integrity of the camera and/or the audio system of a computing device recording the video or audio content. In response to verifying the integrity of the camera and/or the audio system, a device authentication key is generated, which can then be combined with the user authentication key to generate the cryptographic watermark. Accordingly, a combination of regularly performed user authentication, dynamic watermark management, and device integrity verification offers a robust defense against deep-fake technologies and/or other unauthorized digital content manipulation.

System Overview

Figure 1:
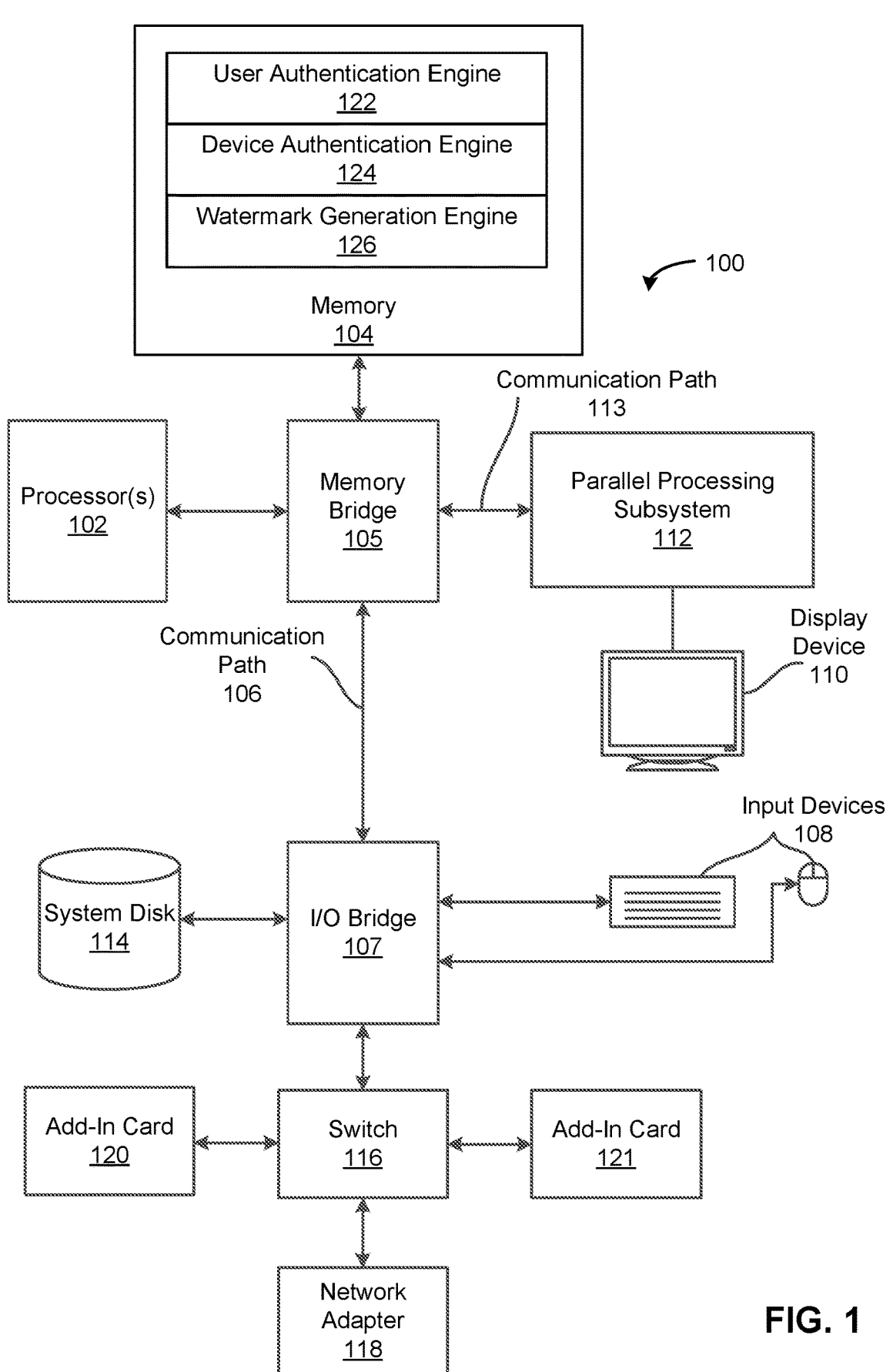
FIG. 1 illustrates a block diagram of a computing system configured to implement one or more aspects of at least one embodiment.

FIG. 1 is a block diagram illustrating a computing system 100 configured to implement one or more aspects of at least one embodiment. In at least one embodiment, computing system 100 may include any type of computing device, including, without limitation, a server machine, a server platform, a desktop machine, a laptop machine, a hand-held/mobile device, a digital kiosk, an in-vehicle infotainment system, and/or a wearable device. In at least one embodiment, computing system 100 is a server machine operating in a data center or a cloud computing environment that provides scalable computing resources as a service over a network.

In various embodiments, computing system 100 includes, without limitation, one or more processors 102 and one or more memories 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as (but not limited to) a keyboard, mouse, touch screen, sensor data analysis (e.g., evaluating gestures, speech, or other information about one or more uses in a field of view or sensory field of one or more sensors), a VR/MR/AR headset, a gesture recognition system, a steering wheel, mechanical, digital, or touch sensitive buttons or input components, and/or a microphone, and forward the input information to processor(s) 102 for processing. In at least one embodiment, computing system 100 may be a server machine in a cloud computing environment. In such embodiments, computing system 100 may omit input devices 108 and receive equivalent input information as commands (e.g., responsive to one or more inputs from a remote computing device) and/or messages transmitted over a network and received via the network adapter 118. In at least one embodiment, switch 116 is configured to provide connections between I/O bridge 107 and other components of computing system 100, such as a network adapter 118 and various add-in cards 120 and 121.

In at least one embodiment, I/O bridge 107 is coupled to a system disk 114 that may be configured to store content and applications and data for use by processor(s) 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, AGP (Accelerated Graphics Port), HyperTransport, or any other bus or point-to-point communication protocol known in the art.

In at least one embodiment, parallel processing subsystem 112 includes a graphics subsystem that delivers pixels to an optional display device 110 that may be any conventional cathode ray tube, liquid crystal display, light-emitting diode display, and/or the like. In such embodiments, parallel processing subsystem 112 may incorporate circuitry optimized for graphics and video processing, including, for example, video output circuitry. Such circuitry may be incorporated across one or more parallel processing units (PPUs), also referred to herein as parallel processors, included within the parallel processing subsystem 112.

In at least one embodiment, parallel processing subsystem 112 incorporates circuitry optimized (e.g., that undergoes optimization) for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and/or compute processing operations. Memor(ies) 104 include at least one device driver configured to manage the processing operations of the one or more PPUs within parallel processing subsystem 112. In addition, memor(ies) 104 include an annotation engine 122, a dialogue engine 124, and an execution engine 126, which can be executed by processor(s) and/or parallel processing subsystem 112.

In various embodiments, parallel processing subsystem 112 may be integrated with one or more of the other elements of FIG. 1 to form a single system. For example, parallel processing subsystem 112 may be integrated with processor(s) 102 and other connection circuitry on a single chip to form a system on a chip (SoC).

Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA) (which may include one or more VPUs and/or direct memory access (DMA) systems), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing system 100 may correspond to a physical computing system (e.g., a system in a data center or a machine) and/or may correspond to a virtual computing instance executing within a computing cloud.

In at least one embodiment, processor(s) 102 issue commands that control the operation of PPUs. In at least one embodiment, communication path 113 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of processors 102, and the number of parallel processing subsystems 112, may be modified as desired. For example, in at least one embodiment, memor(ies) 104 may be connected to processor(s) 102 directly rather than through memory bridge 105, and other devices may communicate with memor(ies) 104 via memory bridge 105 and processors 102. In other embodiments, parallel processing subsystem 112 may be connected to I/O bridge 107 or directly to processor(s) 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 may be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in at least one embodiment. For example, the parallel processing subsystem 112 may be implemented as a virtual graphics processing unit(s) (vGPU (s)) that renders graphics on a virtual machine(s) (VM(s)) executing on a server machine(s) whose GPU(s) and other physical resources are shared across one or more VMs.

In some embodiments, each of user authentication engine 122, device authentication engine 124, and watermark generation engine 126 include functionality to combat misuse of deepfakes and ensure the authenticity of media origination by dynamically managing cryptographic watermark embedding based on real-time biometric authentication. User authentication engine 122 performs one or more biometric authentication operations to authenticate the user using a unique biological trait of the user to verify their identity. Nonlimiting examples of operations that can be performed to biometrically authenticate the user include voice recognition, facial recognition, iris scanning, fingerprint scanning, and so forth. Further, two or more biometric authentication operations could be required—e.g., voice and facial recognition, etc.—to authenticate the user in some instances. Accordingly, upon successful biometric authentication, user authentication engine 122 generates a user authentication key for the instance.

Device authentication engine 124 performs device attestation to verify the integrity of at least one of a camera or audio system of a computing device of the user. In one embodiment, device attestation is performed using the Trusted Computing Group (TCG) Device Identifier Composition Engine (DICE) to verify integrity of a set of hardware components of the computing device. Additionally, in one or more embodiments, DICE is extended beyond the hardware to validate one or more software components, including the recording application recording the video and/or audio content. As described in further detail herein, device attestation individually validates each of a set of hardware components and software components related to the recording application. Upon successful validation of a component, device authentication engine 124 generates a verification certificate that is added to a verification chain. Each verification certificate corresponds to a component of the set of hardware and software components and each component corresponds to a link in a verification chain where each link adds a unique secret to the verification chain. Accordingly, device authentication engine 124 generates a device authentication key using the verification chain or otherwise causes the device authentication key to be unlocked upon successful validation the verification chain.

Watermark generation engine 122, in one or more embodiments, generates a cryptographic watermark by cryptographic binding of the user authentication key, the device authentication key, and a timestamp for a frame of the recording of the video or audio content corresponding to the instance. Watermark generation engine 122 then embeds the cryptographic watermark into a frame of the content for the instance.

Figure 2:
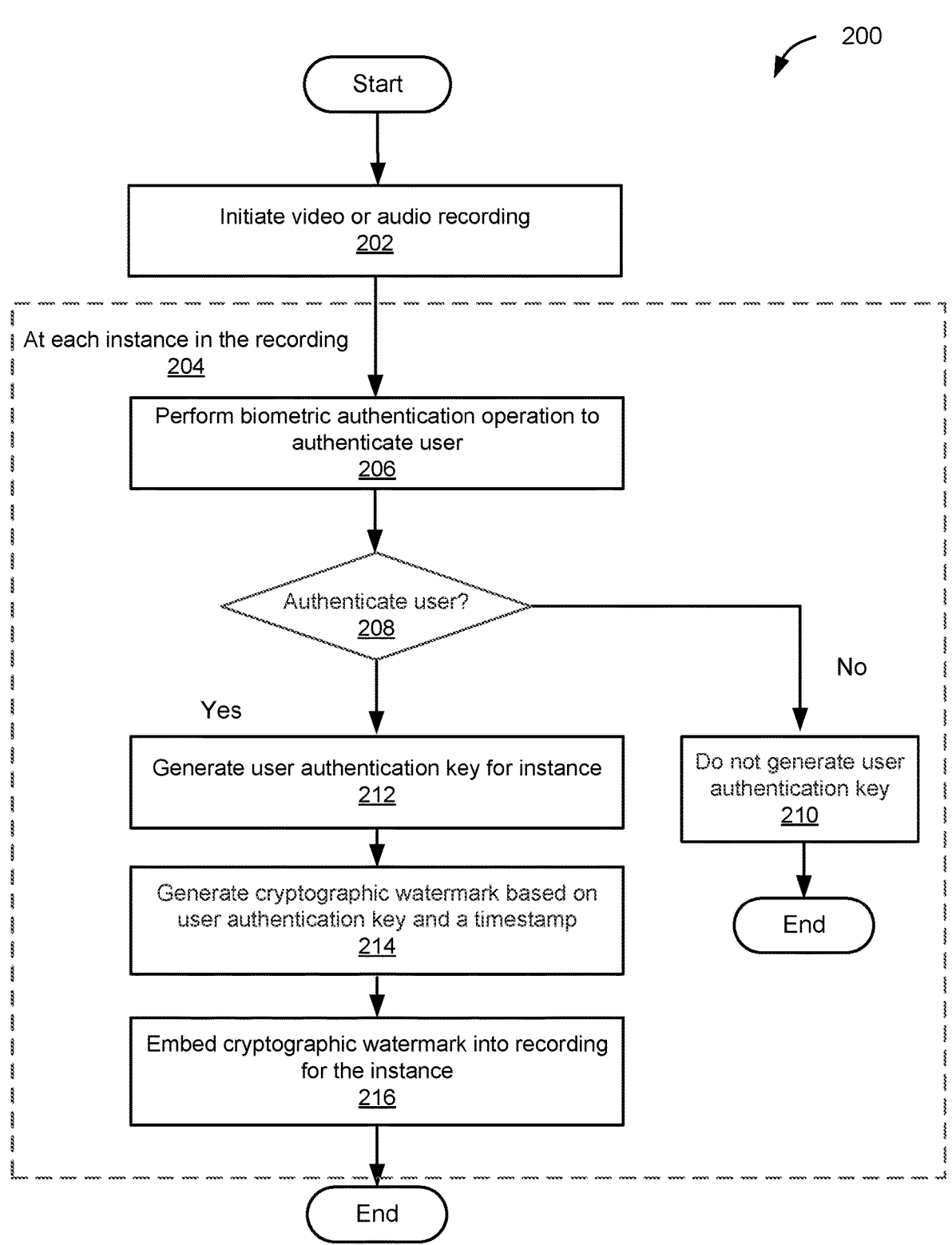
FIG. 2 illustrates a flow diagram of a method for watermarking digital visual and/or audio representations based on continuous user biometric authentication during recording, according to at least one embodiment.

Watermarking Media Based on Continuous User Biometric Authentication During Recording FIG. 2 illustrates a flow diagram of a method 200 for generating cryptographic watermarks based on user biometric authentication for incorporation into video and/or audio content, according to at least one embodiment. Alternative embodiments may include more, fewer, or different steps from those illustrated in FIG. 2, and the steps may be performed in a different order from that illustrated in FIG. 2.

As shown in FIG. 2, method 200 begins with operation 202, where a user initiates a video or audio recording session—such as an avatar and/or live stream recording. Accordingly, at each of a number of instances 204 in the recording of video or audio content, user authentication engine 122 performs, at operation 206, one or more biometric authentication operations to authenticate a user. The term "instance" is used to refer to when the biometric operations are performed—such as a number of frames or a time between authentication operations. In one embodiment, a biometric authentication operation is performed at each frame of the video or audio content to check for continuous presence during the recording. In this example, an instance 204 would occur at each frame. The biometric authentication operations may also be performed every set of frames—such as, every 2, 5, or n frames—or at a time interval—such as, every second or every n seconds.

Additionally, in one embodiment, the instances at which biometric authentication is performed are determined based on whether the user is speaking during the recording. Accordingly, in this embodiment, user authentication engine 122 analyzes the video or audio content and identifies when the user is speaking. In response to identifying that the user is speaking, user authentication engine 122 causes biometric operations to be performed for the duration of the user's speech. As above, the biometric authentication operations can be performed at each frame, a set of frames, or at a time interval while the user is speaking.

In another embodiment, the instances at which biometric authentication is performed are determined based on whether the user spoke one or more predetermined trigger words or phrases during the recording. Accordingly, in this embodiment, user authentication engine 122 analyzes audio of the recording to identify trigger words or phrases spoken by the user. In one embodiment, user authentication engine 122 either stores or accesses a data store of predefined words, a set of words, and/or phrases deemed impactful and that, if changed, would likely have greater than a threshold impact on the meaning of a statement. Thus, in response to identifying that the user spoke a trigger word or phrase, user authentication engine 122 causes biometric authentication operations to be performed while the trigger word(s) or phrase(s) are being spoken.

In operation 208, user authentication engine 122 determines whether the user was successfully authentication. If the user is successfully authentication, then, at operation 212, user authentication engine generates a user authentication key for the instance. Conversely, in response to unsuccessful user authentication in operation 208, user authentication engine 122, at operation 210, does not generate a user authentication key and the process ends without a watermark being generated for the instance of video or audio content. Accordingly, failure to authenticate results in the automatic removal or invalidation of the watermark. In one embodiment, unsuccessful authentication causes the video or audio recording session to end.

In operation 214, watermark generation engine 126 generates a cryptographic watermark based on the user authentication key and a timestamp for the instance of video or audio content. Accordingly, real-time biometric authentication ensures that the user interacting with or recording the content is an authorized individual, thus preventing unauthorized users from misusing digital avatars or live streams.

In operation 216, watermark generation engine 126 embeds the cryptographic watermark into the recording for the instance. Thus, watermarks are embedded or removed in real-time based on the continuous authentication status. This dynamic approach ensures that the watermarked content is being generated by an authenticated user, effectively thwarting attempts to misuse digital representations.

In various embodiments, the watermarks can be overt or covert and can watermark both the video and audio of an audiovisual file to ensure synchronized authenticity verification. A covert watermark is a hidden and discreet pattern or digital marker that when embedded in the content is not readily apparent to the viewer. Unlike overt watermarks that are intentionally visible, covert watermarks are designed to be subtle and imperceptible, for example to the naked eye. These watermarks are usually detected using specialized software or techniques for verification and ownership validation. Examples of covert watermarks include steganographic watermarks that are hidden within the content by, for example, altering insignificant bits of pixel values—such as color changes or refresh rates that are imperceptible to the human eye. Additionally, an audio watermark may encode what sounds like background noise to a human ear or sound that is imperceptible to the human ear yet can be validated using software validation techniques. Steganographic embedding of the watermark provides a discreet verification method that preserves the aesthetic integrity of the content while still ensuring its authenticity. Various other watermarking techniques may also be used within the scope of the present disclosure. Additionally, while some previous solutions may watermark audio or video separately, the described method unifies the watermarking approach for both audio and visual outputs, ensuring synchronized authenticity verification across different media types.

Device Attestation

Figure 3:
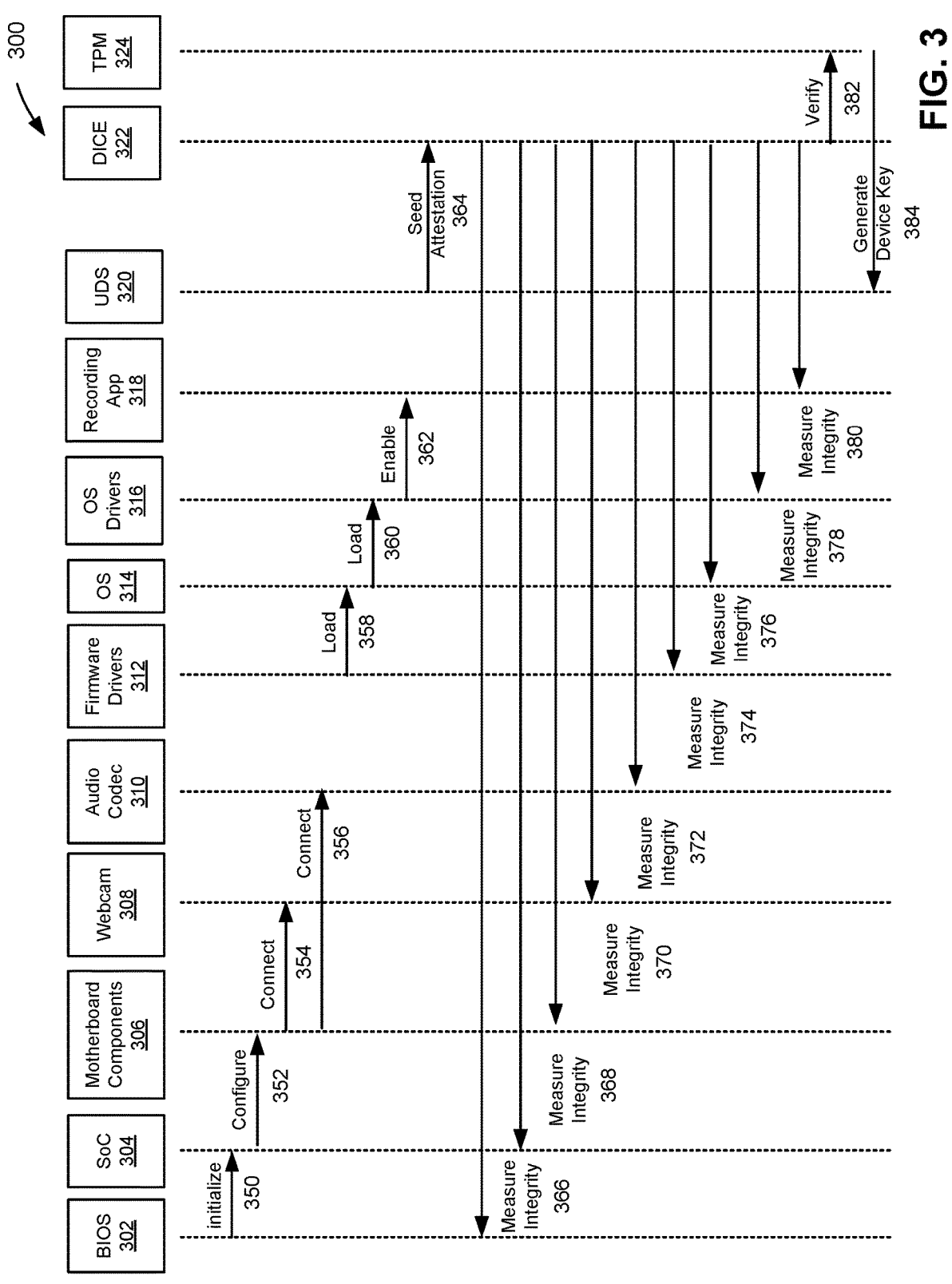
FIG. 3 illustrates a process flow diagram for device attestation, according to at least one embodiment.

FIG. 3 illustrates a process flow diagram 300 for device attestation for a computing device, according to at least one embodiment. Device attestation is a process that ensures the integrity and authenticity of a computing device. In various embodiments, process flow diagram 300 includes, without limitation, BIOS 302, SoC 304, motherboard components 306, webcam 308, audio codec 310, firmware drivers 312, operating system (OS) 314, OS drivers, recording application 318, unique device secret (UDS) 320, DICE 322, and trusted platform module (TPM) 324. Alternative embodiments may include more, fewer, or different steps from those illustrated in FIG. 3, and the steps may be performed in a different order from that illustrated in FIG. 3.

When the computing device of the user is powered on, BIOS 302 initializes 350 and is loaded into memory. BIOS 302 performs basic hardware checks and configures 352 essential components, such as SoC 304. SoC 304 configures 352 motherboard components 306, and motherboard components 306 connects 354 to webcam 308 and connects 356 to audio codec 310. Additionally, firmware drivers 312 and TMP 324 are initialized during the BIOS 302 process. TPM is a hardware-based security feature that provides a secure environment for attestation. Firmware drivers 312 load 358 OS 314 and OS 314 loads 360 OS drivers 316 that enable 362 recording application 318.

UDS 320 is a piece of confidential information or cryptographic key that is unique to a particular computing device. DICE 322 may have exclusive access to UDS 320 and relies on this unique device secret to create secrets for each link in the DICE 322 chain. For example, each link may use a cryptographic one-way function to compute a secret for the next link in the chain. During device attestation, BIOS 302 measures the integrity 366 of SoC 304 and this cryptographic one-way function computes a secret for this link in the chain. Next, SoC 304 measures the integrity 368 of motherboard components 306 and the cryptographic one-way function computes another secret for this next link and adds it to the chain. Accordingly, motherboard components 306 will then measure the integrity 370 of webcam 308; webcam 308 will then measure the integrity 372 of audio codec 310; audio codec 310 will then measure the integrity 374 of firmware drivers 312; firmware drivers 312 will measure the integrity 376 of OS 314; OS 314 will measure the integrity 378 of OS drivers 316 and measure the integrity 380 of recording application 318. Each of these integrity measurements creates a link in a DICE 322 chain and each of these links adds a unique secret to the chain. Thus, if any of these links in the chain are modified, the entire chain gets modified. This modification constitutes proof that someone has at least attempted to alter the device or circumvent device security.

Finally, in response to the entire DICE chain being verified, DICE 322 verifies 382 the integrity of the recording platform and communicates this verification to TPM 324. Accordingly, TPM 324 generates the device authentication key 384—or causes the device authentication key to be unlocked-in response to receiving verification from DICE 322.

Figure 4:
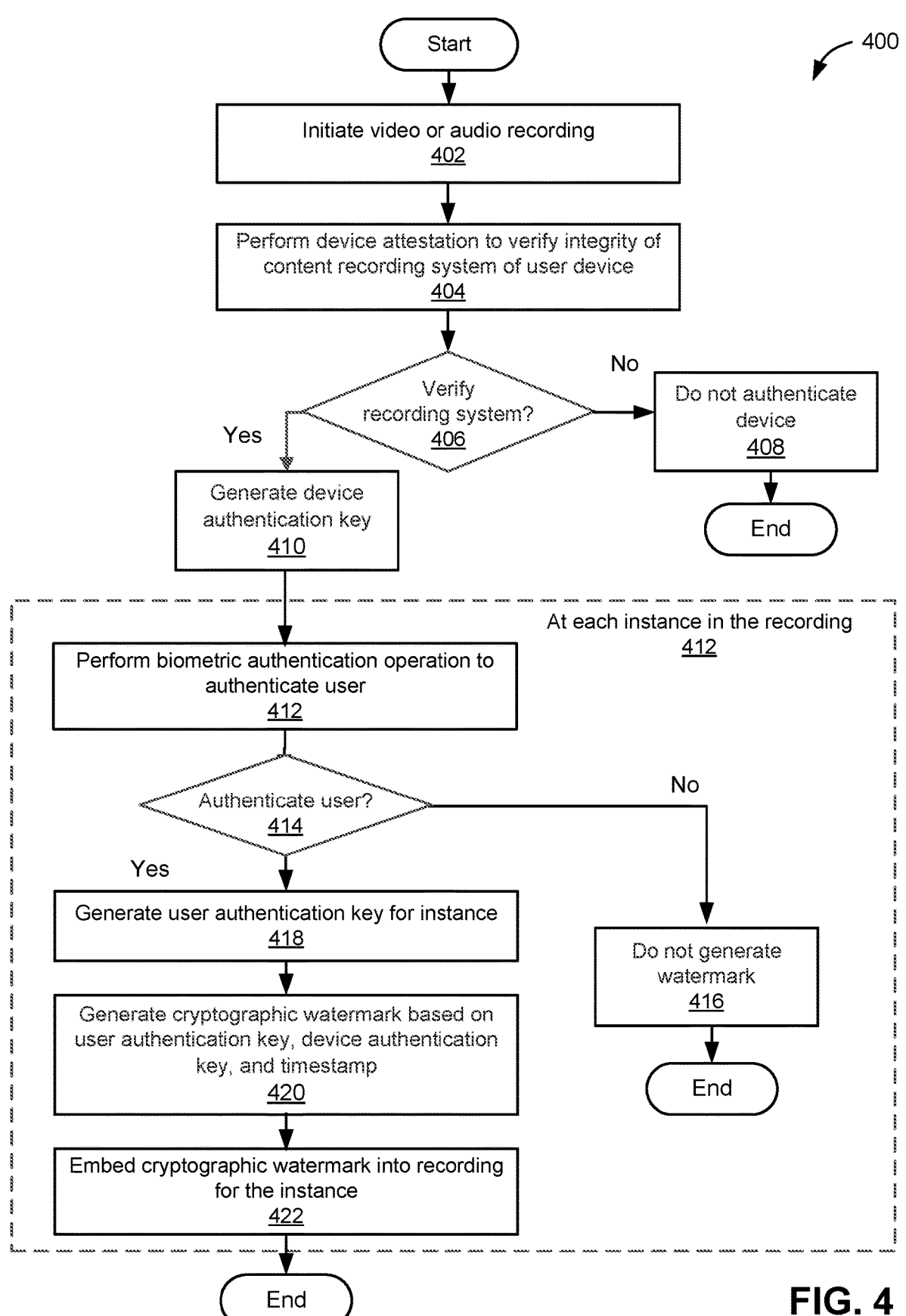
FIG. 4 illustrates a flow diagram of a method for watermarking digital visual and/or audio representations based on a combination of device attestation and continuous user biometric authentication, according to at least one embodiment.

Watermarking Media Based on Device Attestation and Continuous User Biometric Authentication During Recording FIG. 4 illustrates a flow diagram of method 400 for generating cryptographic watermarks based on user biometric authentication and device attestation for incorporation into video and/or audio content, according to at least one embodiment. Alternative embodiments may include more, fewer, or different steps from those illustrated in FIG. 4, and the steps may be performed in a different order from that illustrated in FIG. 4. Method 400 begins with operation 402, where a user initiates a video or audio recording session-such as an avatar and/or live stream recording.

In operation 404, device authentication engine 124 performs device attestation to verify the integrity of the content recording system of the user's computing device. In one embodiment, device attestation is performed using TCG DICE to verify integrity of a set of hardware components of the computing device. Additionally, in one or more embodiments, DICE is extended beyond the hardware to validate the recording application that is recording of the video and/or audio content. In this example, device attestation is shown being performed after initiation of an avatar and/or live stream recording. However, in various embodiments, device attestation may be performed at startup of the device, each time the user begins recording, or at various instances during the recording—such as every n seconds or minutes, every n frames.

In operation 406, device authentication engine 124 determines whether the recording system, e.g., the user's computing device, is authenticated. If the user's computing device is authenticated, then device authentication engine 124, at operation 410, generates a device authentication key in response to successfully authenticating the user's computing device, as described herein. Conversely, in response to unsuccessful device authentication in decision operation 406, device authentication engine 122, at operation 408, does not authenticate the user's computer device and, therefore, does not generate or unlock the device authentication key. As a result, the process ends without a watermark being generated for the instance of video or audio content and, in some embodiments, the video or audio recording session is ended. Failure to authenticate results in the automatic removal or invalidation of the watermark.

Accordingly, at each of a number of instances 412 in the recording of video or audio content, user authentication engine 122 performs 412 one or more biometric authentication operations to authenticate a user. As described herein, a biometric authentication operation may be performed at each frame of the video or audio content, every set of frames, or every second or few seconds to ensure continuous use presence during the recording.

In decision operation 414, user authentication engine 122 determines whether the user is authenticated. If the user is authenticated, then user authentication engine 122, at operation 418, generates a user authentication key for the instance in response to successfully authenticating the user. Conversely, in response to unsuccessful user authentication in operation 414, user authentication engine 122, at operation 416, does not generate a user authentication key and the process ends without a watermark being generated for the instance of video or audio content. Accordingly, failure at this stage in the authentication process additionally results in the automatic removal or invalidation of the watermark—even though device authentication engine 124 successfully verified the user's computing device in operation 406.

In operation 420, watermark generation engine 126 generates a cryptographic watermark based on the device authentication key, the user authentication key, and a timestamp for the instance of video or audio content. Accordingly, device attestation ensures that the hardware and recording application of the user's device are intact and have not been compromised and real-time biometric authentication performed at each instance ensures that the user interacting with or recording the content is an authorized individual, thus preventing unauthorized users from misusing digital avatars or live streams.

In operation 422, watermark generation engine 126 embeds the cryptographic watermark into the recording for the instance. In one embodiment, the cryptographic watermark contains one or more of a timestamp, a frame number, the device authentication key, and the user authentication key. Thus, watermarks are embedded or removed in real-time based on the continuous authentication status after, in one embodiment, successful device authentication. This dynamic approach ensures that the watermarked content is being generated by an authenticated user, effectively thwarting attempts to misuse digital representations. The cryptographic binding of DICE attestation with the cryptographic watermark to form a compound watermark based on both device authentication and user biometric authentication is a distinctive feature compared to traditional watermarking solutions which have bound neither device integrity attestations nor real-time user biometric authentication into a watermark.

In one embodiment, device attestation includes verifying integrity of a set of hardware components of the computing device and a set of software components, as discussed with respect to FIG. 3. The set of software components includes the operating system and a recording application capturing the video or audio content and the set of hardware components includes the camera or the audio system of the computing device. A verification chain of verification certificates is generated where each verification certificate corresponds to a component of the set of hardware components and the set of software components and each component corresponds to a link in the verification chain. Accordingly, each link adds a unique secret to the verification chain and the device authentication key is generated in response to verifying that the chain is intact.

Watermark Verification

Figure 5:
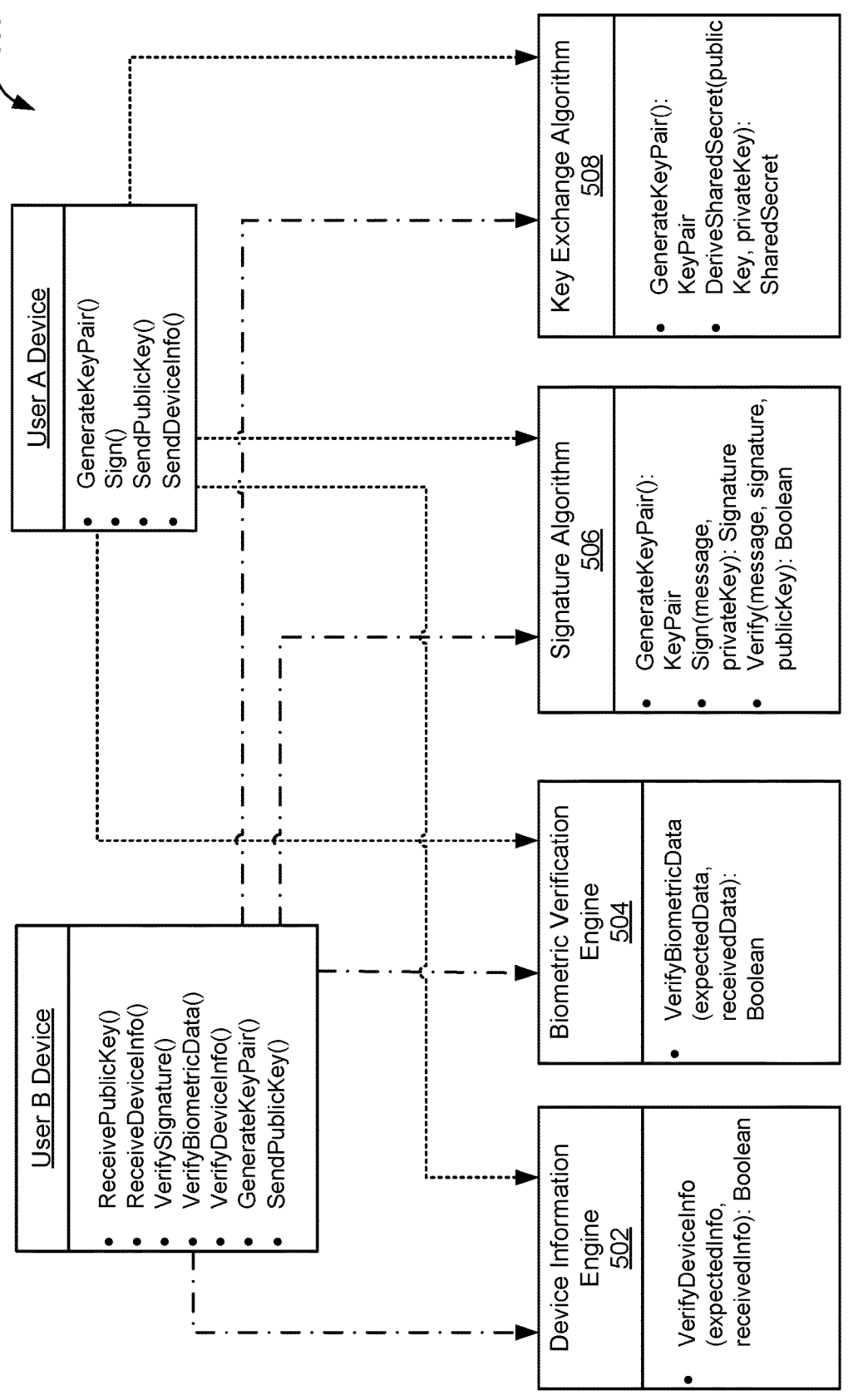
FIG. 5 illustrates a process flow diagram for watermark verification, according to at least one embodiment.

FIG. 5 illustrates a process flow diagram 500 for watermark verification, according to at least one embodiment. In various embodiments, process flow diagram 500 includes, without limitation, UserA device, UserB device, device information engine 502, biometric verification engine 504, signature algorithm 506, and key exchange algorithm 508. Alternative embodiments may include more, fewer, or different steps from those illustrated in FIG. 5, and the steps may be performed in a different order from that illustrated in FIG. 5.

Device information engine 502 verifies that the received device information is correct and matches the expected device information. Biometric verification engine 504 verifies that the received biometric data matches the expected biometric data. Signature algorithm 506 is used to sign data and calculate its hash. A message is then sent along with the hash and the signature algorithm's name or ID. The recipient can then calculate and compare the hash to ensure the message was not changed during transmission. Additionally, signature algorithm 506 can be extended as a post quantum cryptographic (PQC) signature algorithm—such as a crystals dilithium algorithm to render this process quantum resistant. Key exchange algorithm 508 is a method for creating and exchanging a secret key between two or more parties. Additionally, key exchange algorithm 508 can also be extended as a post quantum cryptographic (PQC) key exchange algorithm-such as Kyber or NTRU to render this process quantum resistant.

Accordingly, UserA device generates a key pair using signature algorithm 502 and signs a message or key using the private key of the user operating UserA device. Additionally, UserA device sends biometric data and device information signed with the private key. UserB device receives the public key, biometric data, and device information. UserB device then verifies the signature, biometric data, and device information using the public key of the user operating UserA device. In one embodiment, UserB device uses the PQC algorithms-PQC signature algorithm 506 and PQC key exchange algorithm 508 to verify the signature, biometric data, and device information using the public key of the user operating UserA device. UserB device then generates a key pair for secure communication.

Other variations are within spirit of present disclosure. Thus, while disclosed techniques are susceptible to various modifications and alternative constructions, certain illustrated embodiments thereof are shown in drawings and have been described herein in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

1. In some embodiments, a method comprises at each of a plurality of instances during recording of video or audio content by a user, performing one or more biometric authentication operations to authenticate the user, and responsive to successful authentication of the user, embedding a cryptographic watermark into the content for the instance, wherein the cryptographic watermark is generated based on a user authentication key and represents continuous presence of the user during the recording.

2. The method of clause 1, further comprising performing device attestation to verify integrity of at least one of a camera or audio system of a computing device of the user, and responsive to verifying the integrity of at least one of the camera or audio system, generating a device authentication key, wherein the cryptographic watermark is generated based on a combination of the user authentication key and the device authentication key to form a compound watermark.

3. The method of clauses 1 or 2, wherein the cryptographic watermark is generated by cryptographic binding of the user authentication key, the device authentication key, and a timestamp for a frame of the recording of the video or audio content corresponding to the instance.

4. The method of any of clauses 1-3, wherein performing the device attestation includes verifying integrity of a set of hardware components of the computing device and a set of software components, wherein the set of software components includes a recording application recording the video or audio content and the set of hardware components includes the camera or the audio system of the computing device, and generating a verification chain of verification certificates, each verification certificate corresponding to a component of the set of hardware components and the set of software components, wherein each component corresponds to a link in the verification chain, and wherein each link adds a unique secret to the verification chain.

5. The method of any of clauses 1-4, wherein performing device attestation includes verifying integrity of an operating system of the computing device and an application performing the recording of the video or audio content.

6. The method of any of clauses 1-5, wherein the plurality of instances at which the one or more biometric authentication operations are performed correspond to each frame of the video or audio content, a predetermined set of frames of the video or audio content, or a predetermined time between instances in the recording of the video or audio content.

7. The method of any of clauses 1-6, wherein each of the plurality of instances during recording of video or audio content are determined based at least on identifying that the user is speaking, and causing the one or more biometric authentication operations to be performed at each frame for which the user is speaking.

8. The method of any of clauses 1-7, wherein each of the plurality of instances during recording of video or audio content are determined based at least on analyzing, during the recording of the video or audio content, audio to identify one or more predetermined trigger words or phrases spoken by the user, and responsive to identifying that the user spoke a trigger word or phrase, causing the one or more biometric authentication operations to be performed while the trigger word or phrase is spoken.

9. The method of any of clauses 1-8, further comprising responsive to unsuccessful authentication of the user at an instance of the plurality of instances, causing the cryptographic watermark to be omitted from the video or audio content for the instance.

10. In some embodiments, one or more processors comprising processing circuitry to perform operations comprising at each of a plurality of instances during recording of video or audio content by a user, performing one or more biometric authentication operations to authenticate the user, and responsive to successful authentication of the user, embedding a cryptographic watermark into the content for the instance, wherein the cryptographic watermark is generated based on a user authentication key and represents continuous presence of the user during the recording.

11. The one or more processors of clause 10, wherein the one or more processing units further perform the operations comprising performing device attestation to verify integrity of at least one of a camera or audio system of a computing device of the user, and responsive to verifying the integrity of at least one of the camera or audio system, generating a device authentication key, wherein the cryptographic watermark is generated based on a combination of the user authentication key and the device authentication key to form a compound watermark.

12. The one or more processors of clauses 10 or 11, wherein the cryptographic watermark is generated by cryptographic binding of the user authentication key, the device authentication key, and a timestamp for a frame of the recording of the video or audio content corresponding to the instance.

13. The one or more processors of any of clauses 10-12, wherein performing the device attestation includes verifying integrity of a set of hardware components of the computing device and a set of software components, wherein the set of software components includes a recording application recording the video or audio content and the set of hardware components includes the camera or the audio system of the computing device, and generating a verification chain of verification certificates, each verification certificate corresponding to a component of the set of hardware components and the set of software components, wherein each component corresponds to a link in the verification chain, and wherein each link adds a unique secret to the verification chain.

14. The one or more processors of any of clauses 10-13, wherein performing the device attestation includes verifying integrity of an operating system of the computing device and an application performing the recording of the video or audio content.

15. The one or more processors of any of clauses 10-14, wherein the one or more processing units further perform the operations comprising responsive to unsuccessful authentication of the user at an instance of the plurality of instances, causing the cryptographic watermark to be omitted from the video or audio content for the instance.

16. The one or more processors of any of clauses 10-15, wherein the one or more processors are comprised in at least one of a system for performing simulation operations, a system for performing digital twin operations, a system for performing collaborative content creation for 3D assets, a system for performing one or more deep learning operations, a system implemented using an edge device, a system for generating or presenting at least one of virtual reality content, augmented reality content, or mixed reality content, a system implemented using a robot, a system for performing one or more conversational AI operations, a system implemented using one or more large language models (LLMs), a system for generating synthetic data, a system for performing one or more generative AI operations, a system incorporating one or more virtual machines (VMs), a system implemented at least partially in a data center, or a system implemented at least partially using cloud computing resources.

17. In some embodiments, a system comprises one or more processors to perform operations comprising at each of a plurality of intervals during recording of video or audio content by a user, performing one or more biometric authentication operations to authenticate the user, and responsive to successful authentication of the user, embedding a cryptographic watermark into the content for the interval, wherein the cryptographic watermark is generated based on a user authentication key and represents continuous presence of the user during the recording.

18. The system of clause 17, wherein the one or more processing further perform operations comprising performing device attestation to verify integrity of at least one of a camera or audio system of a computing device of the user, and responsive to verifying the integrity of at least one of the camera or audio system, generating a device authentication key, wherein the cryptographic watermark is generated based on a combination of the user authentication key and the device authentication key to form a compound watermark.

19. The system of clauses 17 or 18, wherein performing the device attestation includes verifying integrity of a set of hardware components of the computing device and a set of software components, wherein the set of software components includes a recording application recording the video or audio content and the set of hardware components includes the camera or the audio system of the computing device, and generating a verification chain of verification certificates, each verification certificate corresponding to a component of the set of hardware components and the set of software components, wherein each component corresponds to a link in the verification chain, and wherein each link adds a unique secret to the verification chain.

20. The system of any of clauses 17-19, wherein the system is comprised in at least one of a system for performing simulation operations, a system for performing digital twin operations, a system for performing collaborative content creation for 3D assets, a system for performing one or more deep learning operations, a system implemented using an edge device, a system for generating or presenting at least one of virtual reality content, augmented reality content, or mixed reality content, a system implemented using a robot, a system for performing one or more conversational AI operations, a system implemented using one or more large language models (LLMs), a system for generating synthetic data, a system for performing one or more generative AI operations, a system incorporating one or more virtual machines (VMs), a system implemented at least partially in a data center, or a system implemented at least partially using cloud computing resources.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
at each of a plurality of instances during recording of video or audio content by a user,
performing one or more biometric authentication operations to authenticate the user;
performing device attestation to verify integrity of at least one of a camera or audio system of a computing device of the user;
responsive to verifying the integrity of at least one of the camera or audio system, generating a device authentication key; and
responsive to successful authentication of the user, embedding a cryptographic watermark into the video or audio content associated with the instance, the cryptographic watermark generated based at least on a combination of a user authentication key and the device authentication key to form a compound watermark representing continuous presence of the user during the recording.

2. The method of claim 1, wherein the cryptographic watermark is generated by cryptographic binding of the user authentication key, the device authentication key, and a timestamp for a frame of the recording of the video or audio content corresponding to the instance.

3. The method of claim 1, wherein the performing the device attestation includes:
verifying integrity of a set of hardware components of the computing device and a set of software components, wherein the set of software components includes a recording application recording the video or audio content and the set of hardware components includes the camera or the audio system of the computing device; and
generating a verification chain of verification certificates, each verification certificate corresponding to a component of the set of hardware components and the set of software components, wherein each component corresponds to a link in the verification chain, and wherein each link adds a unique secret to the verification chain.

4. The method of claim 1, wherein the performing the device attestation includes:
verifying integrity of an operating system of the computing device and an application performing the recording of the video or audio content.

5. The method of claim 1, wherein the plurality of instances at which the one or more biometric authentication operations are performed correspond to each frame of the video or audio content, a predetermined set of frames of the video or audio content, or a predetermined time between instances in the recording of the video or audio content.

6. The method of claim 1, wherein each of the plurality of instances during recording of video or audio content are determined based at least on:
identifying that the user is speaking; and
causing the one or more biometric authentication operations to be performed at each frame for which the user is speaking.

7. The method of claim 1, wherein each of the plurality of instances during recording of video or audio content are determined based at least on:
analyzing, during the recording of the video or audio content, audio to identify one or more predetermined trigger words or phrases spoken by the user; and
responsive to identifying that the user spoke a trigger word or phrase, causing the one or more biometric authentication operations to be performed while the trigger word or phrase is spoken.

8. The method of claim 1, further comprising:
responsive to unsuccessful authentication of the user at an instance of the plurality of instances, causing the cryptographic watermark to be omitted from the video or audio content for the instance.

9. One or more processors comprising:
processing circuitry configured to perform operations comprising:
at each of a plurality of instances during recording of video or audio content by a user,
performing one or more biometric authentication operations to authenticate the user;
performing device attestation to verify integrity of at least one of a camera or audio system of a computing device of the user;
responsive to verifying the integrity of at least one of the camera or audio system, generating a device authentication key; and
responsive to successful authentication of the user, embedding a cryptographic watermark into the video or audio content associated with the instance, the cryptographic watermark generated based at least on a combination of a user authentication key and the device authentication key to form a compound watermark representing continuous presence of the user during the recording.

10. The one or more processors of claim 9, wherein the cryptographic watermark is generated by cryptographic binding of the user authentication key, the device authentication key, and a timestamp for a frame of the recording of the video or audio content corresponding to the instance.

11. The one or more processors of claim 9, wherein the performing the device attestation includes:
verifying integrity of a set of hardware components of the computing device and a set of software components, wherein the set of software components includes a recording application recording the video or audio content and the set of hardware components includes the camera or the audio system of the computing device; and
generating a verification chain of verification certificates, each verification certificate corresponding to a component of the set of hardware components and the set of software components, wherein each component corresponds to a link in the verification chain, and wherein each link adds a unique secret to the verification chain.

12. The one or more processors of claim 9, wherein the performing the device attestation includes:
verifying integrity of an operating system of the computing device and an application performing the recording of the video or audio content.

13. The one or more processors of claim 9, wherein the one or more processing units further perform operations comprising:
responsive to unsuccessful authentication of the user at an instance of the plurality of instances, causing the cryptographic watermark to be omitted from the video or audio content for the instance.

14. The one or more processors of claim 9, wherein the one or more processors are comprised in at least one of:
- a system for performing simulation operations;
- a system for performing digital twin operations;
- a system for performing collaborative content creation for 3D assets;
- a system for performing one or more deep learning operations;
- a system implemented using an edge device;
- a system for generating or presenting at least one of virtual reality content, augmented reality content, or mixed reality content;
- a system implemented using a robot;
- a system for performing one or more conversational AI operations;
- a system implemented using one or more large language models (LLMs);
- a system for generating synthetic data;
- a system for performing one or more generative AI operations;
- a system incorporating one or more virtual machines (VMs);
- a system implemented at least partially in a data center; or
- a system implemented at least partially using cloud computing resources.

15. A system comprising:
one or more hardware processors configured to perform operations comprising:
- at each of a plurality of intervals during recording of video or audio content by a user,
  - performing one or more biometric authentication operations to authenticate the user;
  - performing device attestation to verify integrity of at least one of a camera or audio system of a computing device of the user;
  - responsive to verifying the integrity of at least one of the camera or audio system, generating a device authentication key; and
  - responsive to successful authentication of the user, embedding a cryptographic watermark into the video or audio content associated with the instance, the cryptographic watermark generated based at least on a combination of a user authentication key and the device authentication key to form a compound watermark representing continuous presence of the user during the recording.

16. The system of claim 15, wherein the performing the device attestation includes:
- verifying integrity of a set of hardware components of the computing device and a set of software components, wherein the set of software components includes a recording application recording the video or audio content and the set of hardware components includes the camera or the audio system of the computing device; and
- generating a verification chain of verification certificates, each verification certificate corresponding to a component of the set of hardware components and the set of software components, wherein each component corresponds to a link in the verification chain, and wherein each link adds a unique secret to the verification chain.

17. The system of claim 15, wherein the system is comprised in at least one of:
- a system for performing simulation operations;
- a system for performing digital twin operations;
- a system for performing collaborative content creation for 3D assets;
- a system for performing one or more deep learning operations;
- a system implemented using an edge device;
- a system for generating or presenting at least one of virtual reality content, augmented reality content, or mixed reality content;
- a system implemented using a robot;
- a system for performing one or more conversational AI operations;
- a system implemented using one or more large language models (LLMs);
- a system for generating synthetic data;
- a system for performing one or more generative AI operations;
- a system incorporating one or more virtual machines (VMs);
- a system implemented at least partially in a data center; or
- a system implemented at least partially using cloud computing resources.

* * * * *